US00RE38832E

(19) United States
(12) Reissued Patent
Thwing

(10) Patent Number: US RE38,832 E
(45) Date of Reissued Patent: Oct. 18, 2005

(54) DUAL-FUNCTION LOCKS AND SUB-ASSEMBLIES THEREFOR

(76) Inventor: Randy L. Thwing, 5001 Dorrell La., Las Vegas, NV (US) 89131

(21) Appl. No.: 10/292,575

(22) Filed: Nov. 12, 2002

Related U.S. Patent Documents

Reissue of:
(64) Patent No.: 6,145,356
Issued: Nov. 14, 2000
Appl. No.: 09/228,900
Filed: Jan. 11, 1999

(51) Int. Cl.[7] ..... E05B 11/00
(52) U.S. Cl. ..... 70/389; 70/51; 70/384; 70/371; 70/379 R
(58) Field of Search ..... 70/31, 38 A–38 R, 70/39, 51, 372, 379 A, 379 R, 380, 381, 389, DIG. 42

(56) References Cited

U.S. PATENT DOCUMENTS

| | | | | |
|---|---|---|---|---|
| 1,564,463 | A | 12/1925 | Best | |
| 1,636,381 | A | 7/1927 | Megie et al. | |
| 1,929,658 | A | 10/1933 | Solliday | |
| 2,213,262 | A | 9/1940 | Segal | 70/461 |
| 2,433,114 | A | 12/1947 | Gray | 70/367 |
| 2,460,615 | A | 2/1949 | Andrew | 70/369 |
| 3,143,872 | A | 8/1964 | Check | 70/38 A |
| 3,172,279 | A | 3/1965 | Patriquin | 70/38 A |
| 3,404,549 | A | 10/1968 | Best | 70/370 |
| 3,728,879 | A | 4/1973 | Best | 70/38 R |
| 3,788,111 | A | 1/1974 | Parlier | 70/364 R |
| 3,793,856 | A | 2/1974 | Lippisch | 70/38 A |
| 3,882,699 | A | 5/1975 | Flack et al. | 70/38 A |
| 4,068,510 | A | 1/1978 | Neary | 70/379 R |
| 4,112,715 | A | 9/1978 | Uyeda | 70/38 A |
| 4,138,868 | A | 2/1979 | Richards, Sr. | 70/38 A |
| 4,290,280 | A | 9/1981 | Yun | 70/38 A |
| 4,419,873 | A | 12/1983 | Sopko | 70/38 A |
| 4,576,026 | A | 3/1986 | Kurt et al. | 70/380 |
| 4,663,953 | A | 5/1987 | Fish et al. | 70/380 |
| 4,689,977 | A | 9/1987 | Wolniak et al. | 70/379 R |
| 4,763,496 | A | 8/1988 | Evans et al. | 70/38 A |
| 4,776,187 | A | 10/1988 | Evans et al. | 70/38 A |
| 4,793,166 | A | 12/1988 | Marks | 70/379 R |
| 4,926,670 | A | 5/1990 | Deforrest, Sr. | 70/380 |
| 5,174,136 | A | 12/1992 | Thwing | 70/38 A |
| 5,363,678 | A | 11/1994 | Meckbach | 70/38 A |
| 5,377,511 | A | 1/1995 | Meckbach | 70/38 A |
| 6,145,356 | A | 11/2000 | Thwing | 70/389 |

OTHER PUBLICATIONS

Medeco Catalog Page, Product No. 51–500–XX, 1979.
Medeco Catalog Page, Product No. 51–510–XX, 1979.
Best Lock Corporation, Catalog Section 4, 1989 (p. 4.19).
Two sheets of drawings Fig. 1–Fig. 7.
Technitips, Helpful Hints from Fellow Locksmiths, Oct. 6, 1992 (p. 9).
MasterLock Catalog pp. 7, 11–13 and 17–18 (undated).

*Primary Examiner*—Suzanne Dino Barrett
(74) *Attorney, Agent, or Firm*—Alix, Yale & Ristas, LLP

(57) ABSTRACT

A dual-function lock in accordance with the invention has an axis-defining lock sub-assembly including first and second axially aligned rotator members having confronting first end faces and oppositely facing second end faces. The sub-assembly has a lost-motion recess and an anchor recess on one confronting face and one recess-engaging member extending from another confronting face to permit lock function selection by placing the recess-engaging member into a particular recess. Alternative dual-function lock sub-assemblies include a unitary rotator bolt and a companion actuator. The rotator bolt has a release-mechanism-engaging portion and an actuator-engaging portion. While a first section of the actuator-engaging portion permits limited lost-motion between the rotator bolt and a companion actuator, a second section prevents lost-motion. The lock function can be selectively determined by placing the companion actuator into the desired first or second section of the actuator-engaging portion.

29 Claims, 10 Drawing Sheets

DUAL-FUNCTION LOCKS AND SUB-ASSEMBLIES THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to the field of key operated locks. More particularly, the present invention is directed to locks, and subassemblies therefor, which can be converted between key-retaining and non-key-retaining functions. Accordingly, the general objects of the present invention are to provide novel and improved methods and apparatus of such character.

2. Description of the Related Art

Key operated locks are broadly classified into two mutually exclusive lock types. Locks of the first type are known as key-retaining locks because in such locks the lock mechanism prevents the key from being removed from the lock while the lock is in an unlocked condition. Locks of the second type are known as non-key-retaining locks because in such locks the lock mechanism permits the key to be removed from the lock while the lock is in the unlocked condition. Most conventional locks only offer one of these lock functions and, hence, are known as single-function locks.

There are practical, functional and security advantages to both types of single-function locks. Since most manufacturers produce single-function locks, lock purchasers normally need to first determine the lock function which meets their particular requirements, and then purchase the single-function lock of the appropriate type. Therefore, locksmiths and other lock suppliers are typically required to stock inventories of both key-retaining and non-key-retaining locks in order to satisfy the needs of all potential lock purchasers.

In order to eliminate the need for locksmiths and other lock suppliers to stock unnecessarily large inventories of both key-retaining locks and nonkey-retaining locks, dual-function locks have been developed. Some exceptionally innovative dual-function padlocks are shown and described in U.S. Pat. No. 5,174,136. Other highly similar dual-function padlocks are shown and described in U.S. Pat. No. 5,363,678. The contents of these two patents are hereby incorporated by reference. Both of these patents represent examples of padlocks which can be readily converted between key-retaining and non-key-retaining functions by the introduction and/or disposal of components between the rotator bolt and the actuator of a lock cylinder. Thus, these locks offer the ability for the purchaser to select the desired lock function at the time of installation or later.

However, none of the dual-function padlocks of the related art can be converted between key-retaining and non-key-retaining functions (i.e., inter1 function lock conversion) without the introduction of and/or the disposal of additional lock components.

SUMMARY OF THE INVENTION

It is, accordingly, an object of the present invention to provide an improved dual-function lock which may be readily converted between key retaining and non-key-retaining lock functions without the introduction of and/or disposal of additional lock components.

It is another object of the present invention to provide improved dual-function lock sub-assemblies which can be used in dual-function locks to facilitate more efficient inter-function lock conversion.

It is yet another object of the present invention to provide dual-function locks sub-assemblies which can be used to retrofit single-function locks to thereby permit these locks to achieve inter-function lock conversion.

It is a further object of the present invention to provide improved dual-function locks which offer an optimal combination of (1) simplicity; (2) reliability; (3) economy; and (4) versatility.

These and other objects and advantages of the present invention are provided in one embodiment in the form of an axis-defining lock subassembly comprising first and second axially aligned rotator members having confronting first end faces and oppositely facing second end faces. At least one lost-motion recess and at least one anchor recess are disposed in one of the confronting end faces such that these recesses are radially offset from the rotation axis. At least one recess-engaging member extends from the other of the confronting end faces. This recess-engaging member cooperates with the recesses to permit lock function selection by placing the recess-engaging member into a particular recess. Specifically, the recess-engaging member can be placed into the anchor recess to prevent relative rotation between the first and second rotator members and to thereby select the key-retaining function. In order to select the non-key-retaining function, the recess-engaging member can be placed into the elongated lost-motion recess, thereby permitting limited motion between the first and second rotator members.

In embodiments utilizing a set-screw, inter-function conversion can be achieved by advancing or retracting the set-screw and by rotating the first and second rotator members relative to one another. In embodiments where the recess-engaging member is a fixed protrusion, the first and second rotator members can be axially displaced from one another, rotated a predetermined distance, and replaced adjacent one another once again. Still further embodiments utilize a spring-loaded pin which can be depressed while rotating the first and second rotator members relative to one another and then released.

In some alternative embodiments of the present invention, the dual-function lock sub-assembly comprises a unitary rotator bolt and a companion actuator. The rotator bolt has a release-mechanism-engaging portion at one end thereof and an actuator-engaging portion at an opposite end thereof. While a first section of the actuator-engaging portion prevents lost-motion between the rotator bolt and a companion actuator, a second section permits limited lost-motion. Thus, in such embodiments, the lock function can be selectively determined by placing the companion actuator into the desired first or second section of the actuator-engaging portion.

In still other embodiments of the present invention, the dual-function lock sub-assembly includes a rotator bolt of one of the types described above and an integral actuator which can be received by a lock cylinder. In this manner, the invention is compatible with an even wider variety of locks and lock cylinders.

Another important feature of the present invention lies in the formation of radial cuts in multiple predetermined locations of the rotator bolt in order to permit the rotator bolt to cooperate with a still wider variety of locks and/or cylinders. For example, if the rotator bolt of the present invention is utilized with a padlock of the type having two oppositely disposed locking balls, forming four radial recesses in the rotator bolt permits a dual-function rotator bolt to accommodate vertical and horizontal tailpieces alike. Other embodiments of the present invention can accommodate both horizontal and vertical tailpieces with fewer radial cuts.

Still other embodiments are compatible with other styles of lock release mechanisms.

Still another advantage of the present invention is that the inventive lock sub-assembly can be utilized to easily retrofit a variety of locks presently in inventory or actual use. Specifically, in accordance with the present invention, dual-function rotator bolts can be crafted to the dimensions of conventional rotator bolts, thereby permitting replacement of conventional rotator bolts with dual-function rotator bolts. Such substitution, thus, offers still greater versatility in the lock art.

Finally, other embodiments of the present invention encompass dual5 function locks which utilize the inventive lock sub-assemblies briefly noted above. While such locks are preferably dual-function padlocks, the present invention is not so limited. In particular, the present invention offers significant advantages when utilized in locks with removable cylinder mechanisms whether they be used in door knobs or padlocks. Similarly, specialized cylinder configurations can also be accommodated with the present invention.

Numerous other advantages and features of the present invention will become apparent to those of ordinary skill in the art from the following detailed description of the invention, from the claims, and from the accompanying drawings.

BRIEF DESCRIPTION OF THE DRAWINGS

The preferred embodiments of the present invention will be described below with reference to the accompanying drawings wherein like numerals represent like structures and wherein:

FIG. 1a is an exploded and partially cut-away perspective illustration of a dual-function padlock in accordance with one preferred embodiment of the invention;

FIG. 1b is an exploded perspective view of the lock sub-assembly depicted in FIG. 1a;

FIGS. 2b–2d are cross-sectional views of the inventive lock subassembly of FIG. 2a;

FIGS. 3b–3d are sectional views of the inventive lock sub-assembly of FIG. 3a;

FIG. 4b is a perspective view of the rotator bolt depicted in FIG. 4a;

FIG. 5b is a perspective view of the rotator bolt of FIG. 5a;

FIG. 6b is a perspective view of the rotator bolt of FIG. 6a;

FIG. 6c is a perspective view of an alternative embodiment of the rotator bolt and actuator utilized in the lock of FIG. 6a;

FIG. 6d is a perspective view of another alternative embodiment of the rotator bolt and actuator utilized in the lock of FIG. 6a;

DETAILED DESCRIPTION OF THE PREFERRED EMBODIMENTS

Dual-function locks, and lock sub-assemblies therefor, in accordance with the preferred embodiments of the present invention will be described with joint reference to the Figures. Throughout this description, however, it is to be understood that, to facilitate understanding of the drawings, only enough structure of the apparatus has been illustrated to enable one skilled in the art to readily understand the underlying principles and concepts of the invention.

Figures 1A, 1B:
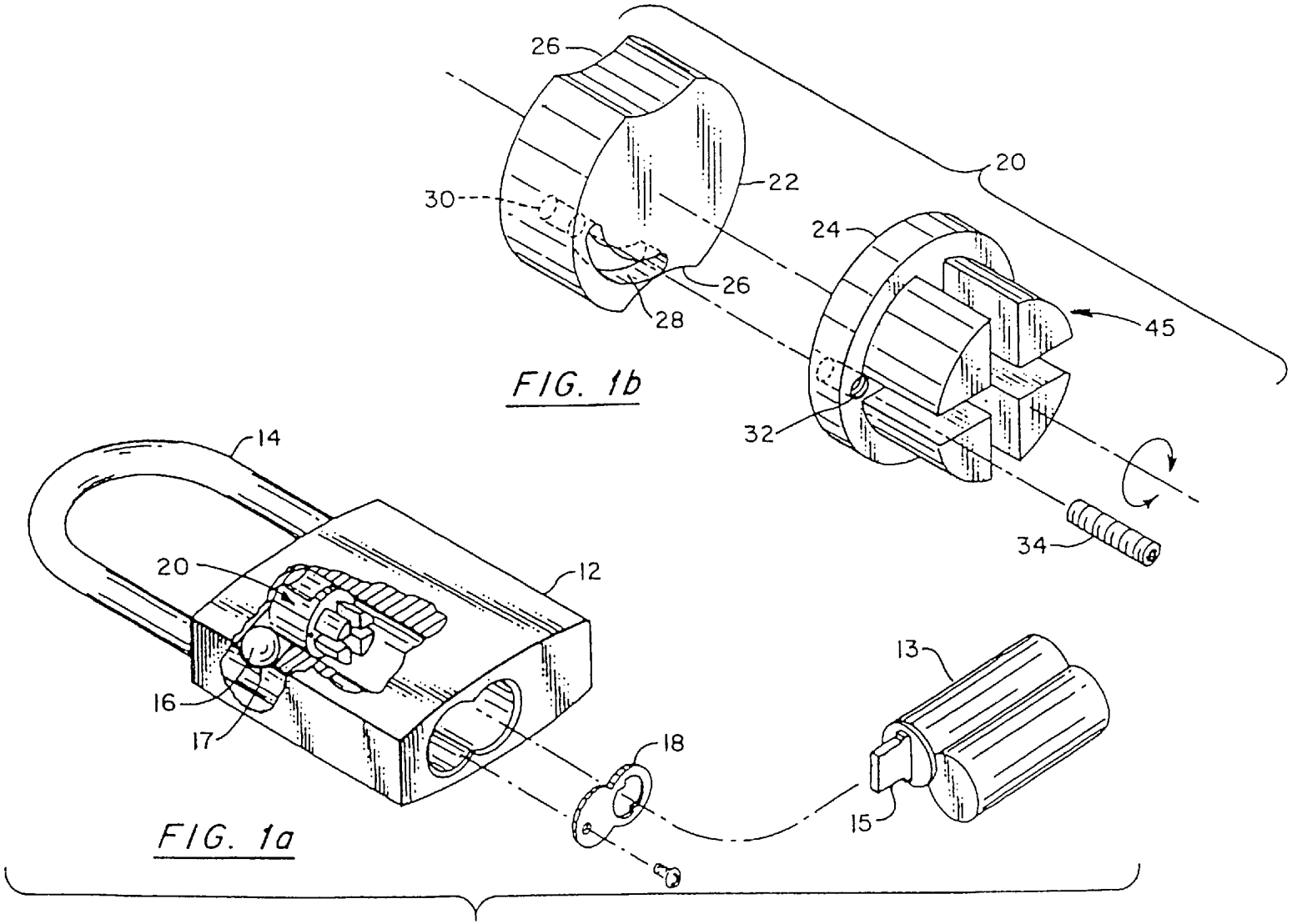

As shown in FIG. 1a, a dual-function padlock 10 preferably comprises a padlock body 12, a lock cylinder 13 with a blade-like actuator 15 extending therefrom, at least one locking ball 16, a shackle 14 with a recess 17 for selectively receiving ball 16, a rotational stop member 18 with an affixation screw and a lock sub-assembly 20. As shown, padlock 10 is of a generally conventional configuration and employs locking ball 16 as a release/locking mechanism to selectively release retain shackle 14 in a locked condition. Those of ordinary skill will readily appreciate that, for example, the particular configuration of padlock body 12, cylinder 13, actuator 15, shackle 14 and release mechanism 16 can assume a wide variety of well-known and equivalent configurations. A mere sampling of such configurations of the related art is provided in the Information Disclosure Statement attached to this application and further references to such components should be understood to encompass these and other configurations known in the art.

Figure 1C:
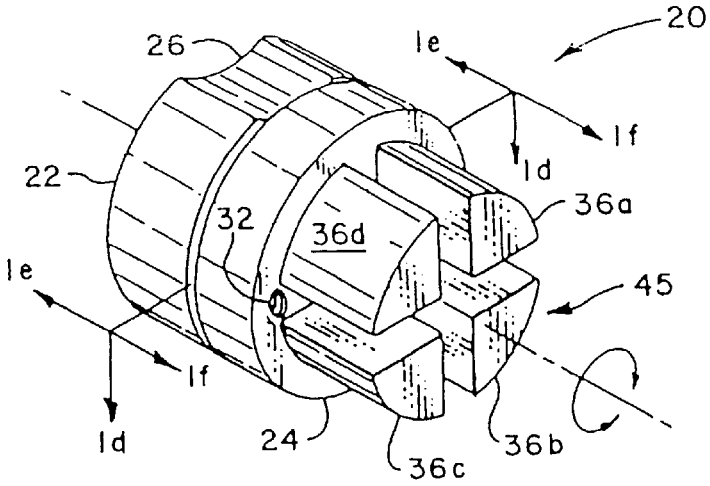
FIG. 1c is a non-exploded perspective view of the lock subassembly of FIG. 1a and 1b.

FIGS. 1b–1f illustrate a dual-function lock sub-assembly 20 in accordance with a first preferred embodiment of the present invention. Sub-assembly 20 comprises a first rotator member 24, a second rotator member 22, a recess-engaging member 34 and a torsion spring 38. In use, first and second rotator members 24, 22 are positioned axially adjacent one another such that respective end faces 42 and 44 (FIGS. 1e and 1f) confront one another (FIG. 1c). Additionally, sub-assembly 20 is configured such that, under certain use conditions, first and second members 24 and 22 rotate about a common rotation axis as shown.

First rotator member 24 comprises confronting end face 44 and second end face 45 from which actuator-engaging protrusions 36a–36d extend. As shown, protrusions 36a–36d preferably extend in a direction which is at least substantially parallel to the rotation axis and are located in four positions arcuately located around the rotation axis at 90° intervals.

Protrusions 36a–36d, thus, are particularly well-suited to engage both horizontal and vertical actuators such that they remain stationary relative to protrusions 36a–36d. Naturally, protrusions 36a–36d could, alternatively, be oriented in many other ways to engage tailpieces of any orientation without departing from the spirit and scope of the invention.

First member 24 also preferably includes an internally threaded bore 32 which is offset from the rotation axis and into which an externally threaded screw (the preferred form of recess-engaging member 34) may be threaded. This arrangement permits recess-engaging member 34 to be accessed from the bottom of a padlock with an appropriate tool for adjustment of the axial position of member 34. It is also possible to rearrange the various elements of this embodiment so that the axial position of member 34 may be adjusted through an aperture through padlock body 12.

Second rotator member 22 is preferably a generally cylindrical member with diametrically opposed radial cuts 26 for engagement with and operational control over release-mechanism 16. As best seen in FIG. 1b, member 22 preferably includes an elongated and arcuately shaped recess 28 of a predetermined length and shallow depth for permitting limited lost-motion between members 22 and 24. Lost-motion recess 28 is preferably disposed on confronting end face 42 and has a deeply threaded anchor recess 30 at one end thereof. As shown therein, anchor recess 30 preferably extends axially deeper into member 22 than shallow recess 28.

Figure 1D:
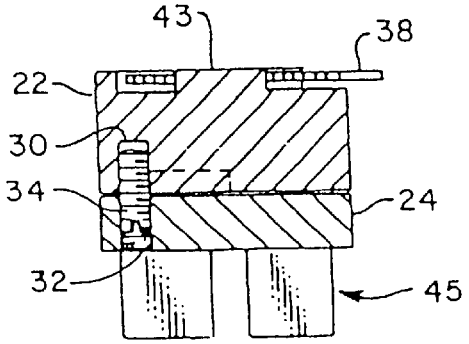
FIGS. 1d–1f are cross-sectional views of the inventive lock subassembly of FIG. 1c.
Figure 1E:
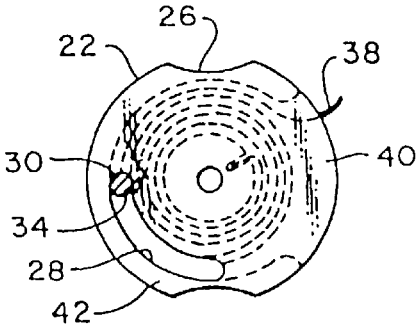

When sub-assembly 20 is installed in padlock 10, a second end face 43 of member 22 abuts against an end wall of padlock body 12 (FIG. 1a). As shown in FIGS. 1d and 1e, optional torsion spring 38 is preferably coiled within a recess 40 below second end face 43. Spring 38 permits automatic locking of padlock 10 upon closure of shackle 14.

Figure 1F:
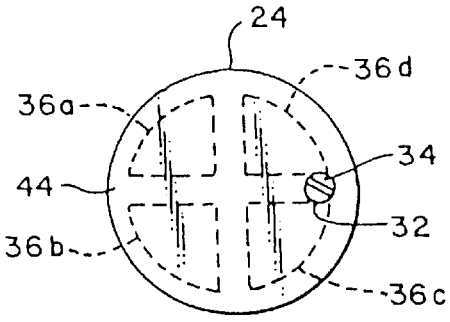

With primary reference now to FIGS. 1d–1f, it will be appreciated that when recess-engaging member 34 is entirely disposed within threaded bore 32, first and second rotator members 24 and 22 are freely rotatable relative to one another about the rotation axis. When member 34 is longitudinally advanced into lost-motion recess 28, however, first and second members 24 and 22 are only capable of limited rotation about the rotation axis. In particular, first and second members 24 and 22 may only rotate to the extent that member 34 can arcuately traverse recess 28. This arrangement provides for lost-motion between first and second rotator members 24 and 22. For example, member 24 can be rotated counterclockwise relative to member 22. Therefore, a padlock employing subassembly 20 configured in this manner will operate in a non-key-retaining mode.

Sub-assembly 20 can also be configured to prevent lost-motion between first and second members 24 and 22 by aligning bore 32 with recess 30 and axially advancing recess-engaging member 34 into the lower depths of recess 30 as shown in FIGS. 1d–1f. In this configuration, relative rotation between first and second rotator members 24 and 22 is prevented and sub-assembly 20 can be utilized in a key-retaining padlock. Naturally, axially retracting member 34 permits limited lost-motion once again. This process for converting between key-retaining and non-key-retaining functions can be repeated as desired.

Figure 1G:
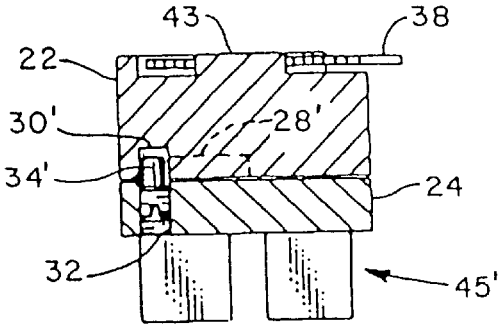
FIG. 1g is a cross-sectional view of a variation of the lock subassembly of FIGS. 1a–1f, FIG. 1g being similar to FIG. 1d.

One small variation of the embodiment of FIGS. 1a–1f is shown in FIG. 1g and entails the use of a dog-point screw 34', threadless recesses 28' and 30' and threaded bore 32'. Despite minor differences, the embodiment of FIG. 1g operates in essentially the same way as the embodiment of FIGS. 1a–1f and simply illustrates that threads are not required either on the end of screw 34 or in recess 30.

Another preferred embodiment of a dual-function lock sub-assembly is illustrated in FIGS. 2a–2d. As indicated by the use of like reference numerals, much of sub-assembly 20a (FIGS. 2a–2d) is substantially similar to sub-assembly 20 (FIGS. 1a–1f). The primary difference between subassembly 20a and sub-assembly 20 resides in (a) the use of a mechanism to resiliently maintain first and second rotator members 24a and 22a adjacent one another; and (b) the particular structure of the recesses and recess-engaging member.

Figure 2A:
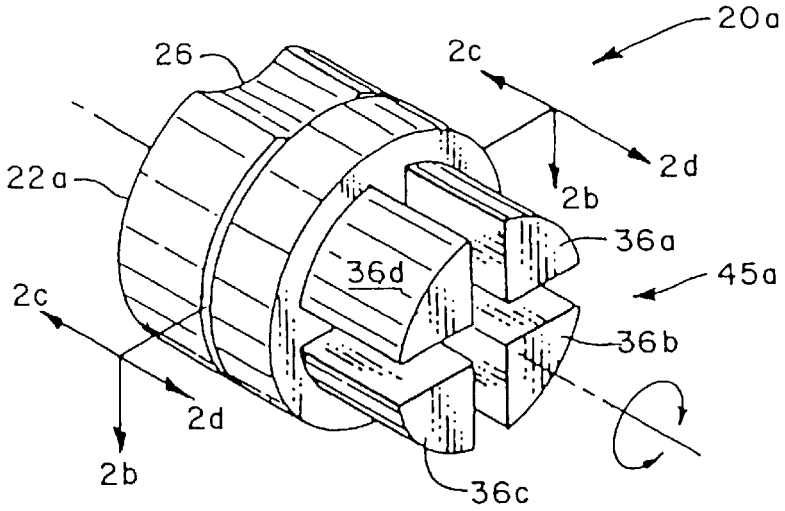
FIG. 2a perspective illustration of a rotator bolt in accordance with another preferred embodiment of the present invention.
Figure 2B:
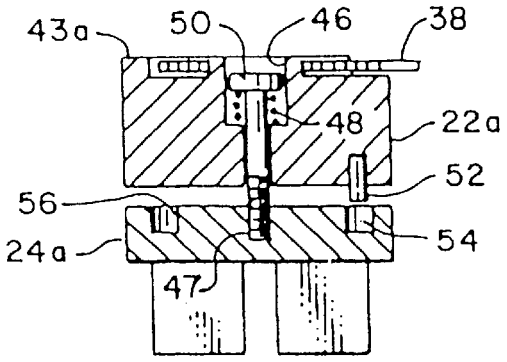

As shown in FIG. 2b, first and second rotator members 24a and 22a are resiliently maintained adjacent one another through the cooperation of apertures 46 and 47, threaded screw 50 and axial bias member 48. As shown therein, threaded screw 50 freely extends through aperture 46 of member 22a and is affixed to (preferably threaded into) aperture 47 of member 24a. Bias member 48 is preferably a compression spring which urges screw 50 toward a second end face 43a of second member 22a.

Accordingly, first rotator member 24a is resiliently biased against first rotator member 22a. First and second members 24a and 22a can, however, be separated to a limited extent by simply pulling them away from one another along the rotation axis.

Figure 2C:
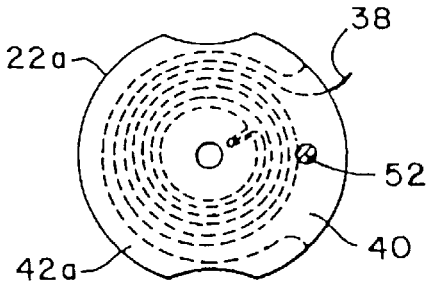
Figure 2D:
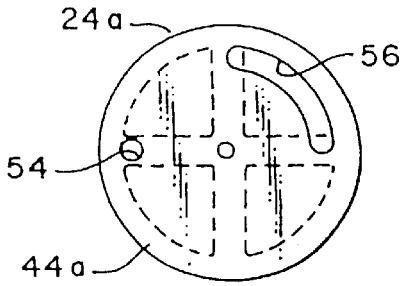

Sub-assembly 20a also differs from sub-assembly 20 in the particular configuration of recesses 54 and 56 and of a cooperating recess-engaging member 52 (preferably an immovable protrusion). As shown in FIGS. 2b–2d, anchor recess 54 and elongated, arcuate recess 56 are disposed within confronting end face 44a. Recess-engaging member 52 is preferably an immovable protrusion disposed on confronting end face 42a. However, those of ordinary skill will readily appreciate that the locations of recesses 54 and 56 and of member 52 can be changed (e.g., reversed) without departing from the spirit and scope of the invention.

When recess-engaging member 52 is disposed within anchor recess 54, lost-motion between first and second members 24a and 22a is prevented and sub-assembly 20a can be used in a key-retaining lock. By contrast, when member 52 is received within elongated recess 56, lost motion about the rotation axis is possible. Thus, sub-assembly 20a can be utilized in a non-key-retaining lock. In order to convert sub-assembly 22a between these lock functions, a user merely needs to axially separate first and second members 24a and 22a, rotate these members relative to one another by the desired amount and permit members 24a and 22a to retract toward one another. As with the embodiment of FIGS. 1a–1f, this inter-function conversion procedure can be repeated as desired.

FIGS. 3a–3d illustrate yet another preferred lock sub-assembly in accordance with the present invention. As indicated by the use of like reference numerals, sub-assembly 20b is substantially similar to subassemblies 20 and 20a, with the primary differences residing in the recesses 64 and 66, the recess-engaging mechanism 58, 60 and 62 and in the configuration of actuator-engaging portion 45b of first rotator member 24b.

Figure 3A:
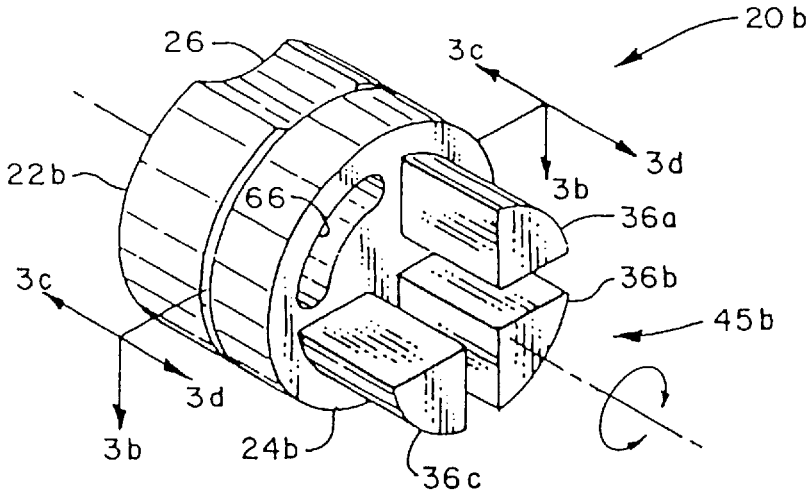
FIG. 3a is a perspective illustration of a lock sub-assembly in accordance with yet another preferred embodiment of the present invention.

As best shown in FIG. 3a, actuator-engaging portion 45b differs from portions 45 and 45a in the particular configuration of protrusions 36a, 36b and 36c extending from the end face of rotator member 24b. As shown, protrusions 36a–36c are disposed at three of four locations arcuately located about the axis at 90° intervals. Also as shown, these protrusions extend substantially parallel to the rotation axis.

In use, rotator bolt 20b can be disposed within a padlock such as lock 10 such that actuator 15 is trapped in a first section between adjacent protrusions 36a and 36b or between protrusions 36b and 36c. Since lost-motion is not possible in such a configuration, actuator 15 is held stationary relative to rotator member 24b.

Recesses 64 and 66 and recess-engaging mechanism 58, 60 and 62 have also been modified in this alternative embodiment. As best shown in FIGS. 3a and 3d, recesses 64 and 66 extend entirely through rotator member 24b. Additionally, recesses 64 and 66 are positioned so as not to interfere with the location of protrusions 36a–36c (see especially FIG. 3d). As will be noted in greater detail below, this feature ensures easy access to spring-loaded pin 62 which serves as the recess-engaging member. In yet another variation of this embodiment, only a small portion of recesses 64 and 66 extend through rotator member 24b. Such configuration permits the presence of a fourth protrusion 36d while still allowing access to recesses 64 and 66 to manipulate spiring-loaded pin 62.

Figure 3B:
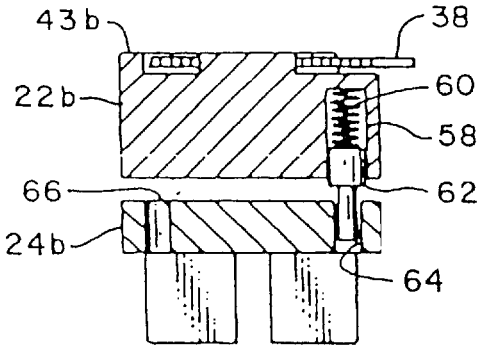
Figure 3C:
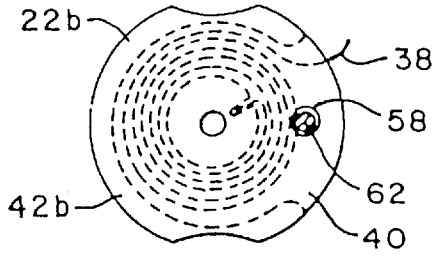
Figure 3D:
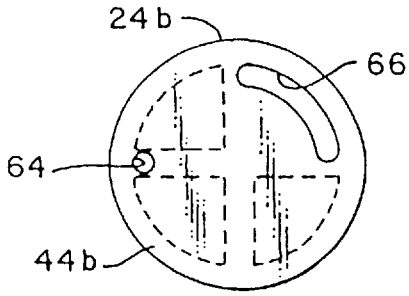

The recess-engaging mechanism of the embodiment of FIGS. 3a–3d comprises pin 62, biasing member 60 and receiving aperture 58. As best shown in FIG. 3b, resilient member 60, which is preferably a compression spring, and pin 62 are disposed for linear reciprocal movement within receiving-aperture 58 such that pin 62 is urged into one of recesses 64 and 66 in a quiescent state. In order to change the recess within which pin 62 is received, pin 62 is accessed from the actuator-engaging side of rotator member 24b and depressed until rotator ember 24b can be rotated about the rotation axis. When the pin becomes aligned with one of recesses 64 and 66, bias member 60 urges member 62 into reception therewith.

Naturally, when pin 62 is received within recess 64, lock sub-assembly 20b is configured to perform a key-retaining function. By contrast, when pin 62 is received within recess 66, lock sub-assembly 20b is configured to perform a non-key-retaining function. As with the earlier embodiments described above, inter-function conversion procedure can be repeated as desired.

Figure 4B:
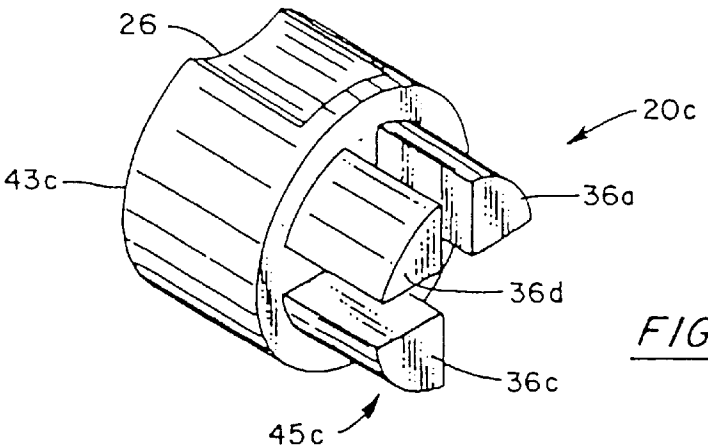
Figure 4A:
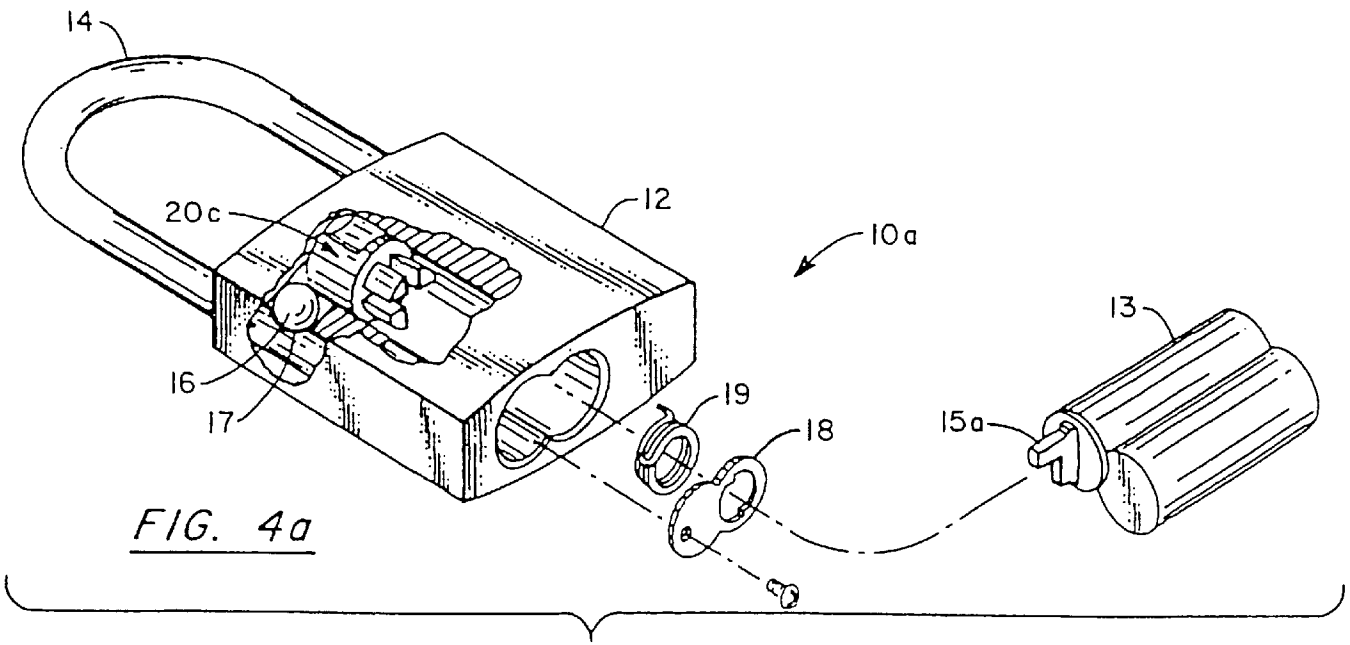
FIG. 4a is an exploded and partially cut-away illustration of a dual-function padlock in accordance with another preferred embodiment of the present invention.

Still another dual-function padlock embodiment of the present invention is illustrated in FIG. 4a. As indicated by the use of like reference numerals, padlock 10a of FIG. 4a is substantially similar to padlock 10 of FIG. 1a. The primary differences between these padlocks resides in the structure of rotator bolt 20c and of actuator 15a extending from lock cylinder 13. As shown in FIG. 4a, actuator 15a is preferably a substantially blade-like tailpiece extending at least substantially parallel to an axis defined by cylinder 13. Additionally, actuator 15a preferably includes an extended portion at the free end thereof (which is entirely on one side of the rotation axis of cylinder 13) for engagement with rotator bolt 20c.

Rotator bolt 20c is best illustrated in FIG. 4b. As shown therein, rotator bolt 20c comprises a structure 26 for engaging release-mechanism 16 of padlock 10a at a second axial end 43c thereof. Rotator bolt 20c also comprises an actuator-engaging portion 45c at an opposite axial end which includes three protrusions 36a, 36c and 36d disposed at three of four positions arcuately located about the axis at 90° intervals. As shown, these protrusions preferably extend substantially parallel to the rotation axis.

In use, the rotator bolt 20c can be disposed within a padlock such as lock 10a such that actuator 15a is trapped in a first section between adjacent protrusions 36a and 36d. Since lost-motion is not possible in such a configuration, padlock 10a, as thus configured, operates in a key-retaining mode. Alternatively, rotator bolt 20c can be rotated 180° from the orientation shown in FIGS. 4a and 4b so that tailpiece 15a can be inserted into a second section between the enlarged arcuate space between protrusions 36a and 36c. In this configuration, padlock 10a permits lost-motion between rotator bolt 20c and actuator 15a. Therefore, as thus configured, padlock 10a operates in a non-key-retaining mode. Those of ordinary skill will readily appreciate that optional spring 19 provides the customary automatic locking feature of non-key-retaining locks and that optional rotational stop 18 provides the customary mechanism to preclude over-rotation of actuator 15a.

Figure 5B:
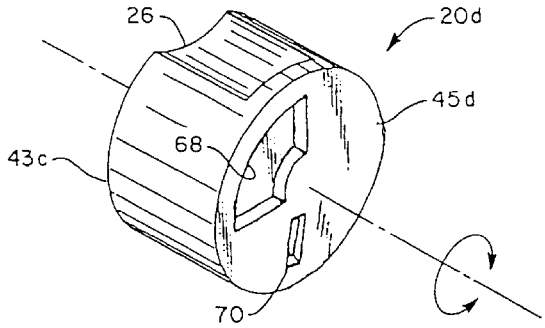
Figure 5A:
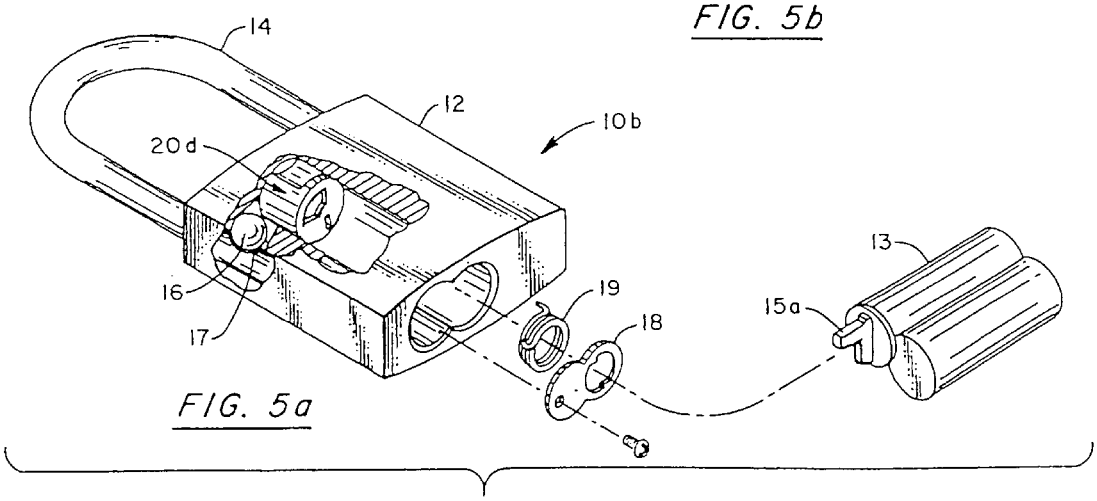
FIG. 5a is an exploded and partially cut-away illustration of a dual-function padlock in accordance with still another preferred embodiment of the present invention.

Yet another preferred dual-function padlock of the present invention is shown in FIG. 5a. As indicated by the use of like reference numerals, much of padlock 10b (FIG. 5a) is substantially similar to padlock 10a of FIG. 4a. The primary differences between padlock 10b of FIG. 5a and padlock 10a of FIG. 4a resides in the structure of rotator bolt 20d. In particular, rotator bolt 20d offers the capability of operating in both key-retaining and non-key-retaining functions due to the structure of actuator-engaging portion 45d. With primary reference to FIG. 5b, portion 45d includes a first section having a lost-motion recess 68 (preferably an elongated arcuate recess) which provides for lost-motion between rotator bolt 20d and actuator 15a, and a second section having an anchor recess 70 arcuately spaced from the recess 68. It will be readily appreciated that anchor recess 70 precludes lost-motion between rotator bolt 20d and tailpiece 15a. It will also be appreciated that selection between the key-retaining and non-key-retaining modes of operation is permitted by selective reorientation of rotator bolt 20d and selective placement of actuator 15a as described above with respect to rotator bolt 20c.

Figure 6A:
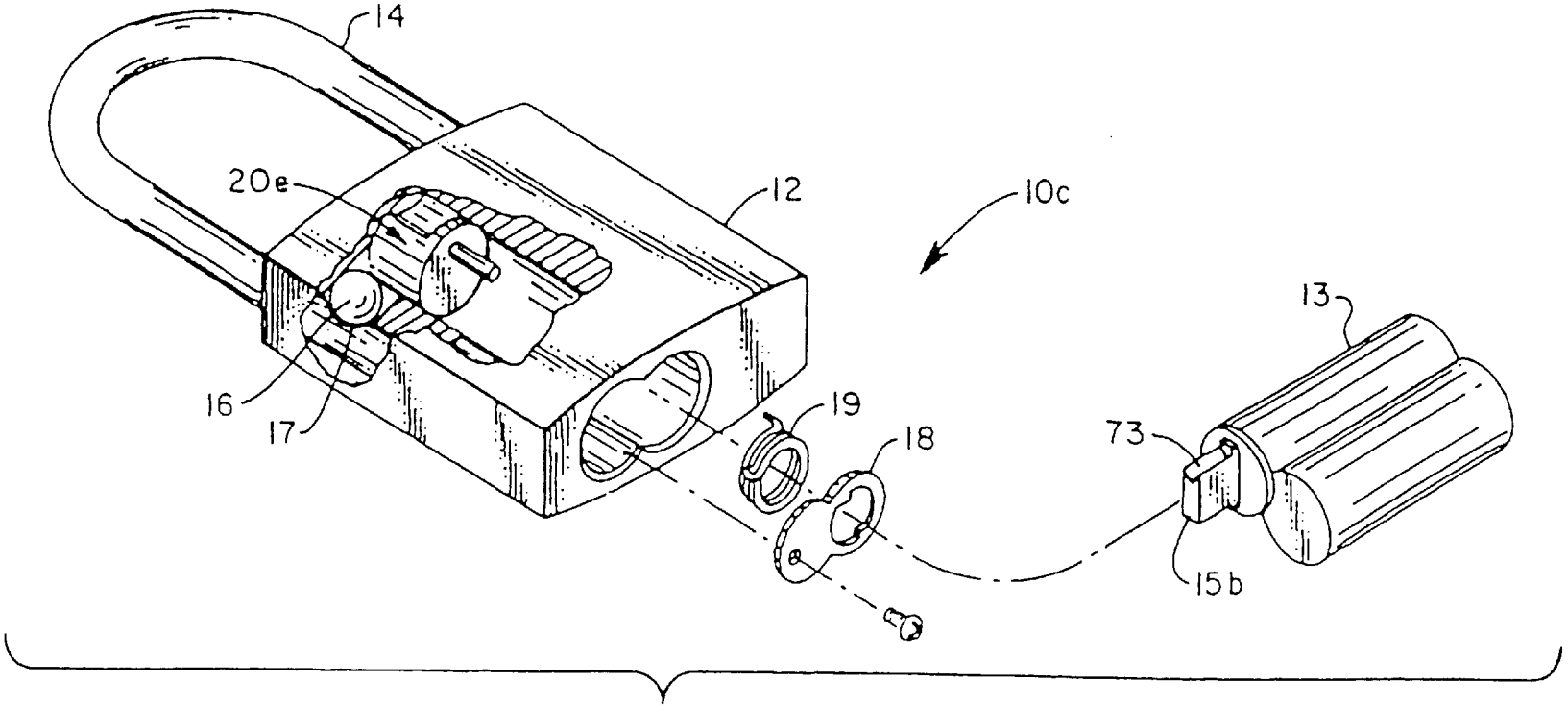
FIG. 6a is an exploded and partially cut-away illustration of yet another dual-function padlock in accordance with a preferred embodiment of the present invention.
Figure 6B:
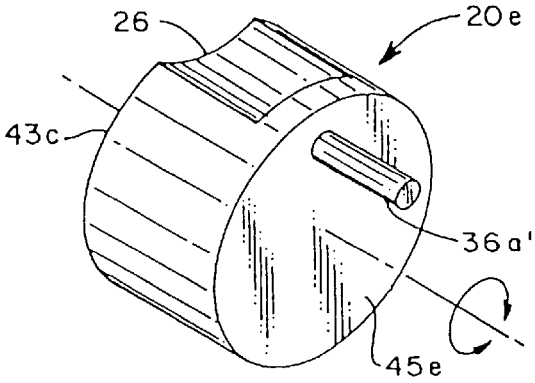

Still another preferred dual-function padlock of the present invention is shown in FIGS. 6a–6d. As indicated by the use of like reference numerals, much of padlock 10c is substantially similar to padlocks 10 and 10b. The primary difference between padlock 10c (FIG. 6a) and padlocks 10a and 10b (FIGS. 4a and 5a) resides in rotator bolt 20e and its companion actuator 15b. In particular, blade-like actuator 15b is provided with an elongated recess 73 extending in an axial direction along the length of actuator 15b. Recess 73 is preferably complementary in cross-sectional shape to the profile of protrusion 36a' of rotator bolt 20e (see especially FIG. 6b). As illustrated in FIG. 6b, cross-sectionally circular protrusion 36a' extends from the end face of actuator-engaging portion 45e of rotator bolt 20e in a direction which is at least substantially parallel to the rotation axis of rotator bolt 20e. Naturally, protrusion 36a' is designed to be snugly received within recess 73. This forms a first (no lost-motion) section. A second (lost-motion) section includes the entire region which arcuately surrounds (ie., is either to the left or right of) this first section or any portion thereof.

Key-retaining operation (i.e., with no lost-motion) of padlock 1Oc can be effectuated by orienting actuator 15b relative to rotator bolt 20e such that, upon insertion of cylinder 13 into padlock body 12, at least a part of protrusion 36a' is snugly received within recess 73 (i.e., by placing actuator 15b into the first section). By contrast, non-key-retaining operation of padlock 10c can be effectuated by orienting tailpiece 15b relative to rotator bolt 20e such that tailpiece 15b lies to one side of protrusion 36a' (i.e., by placing actuator 15b into the second section).

Thus, lost-motion between rotator bolt 20e and actuator 15b is provided so that padlock 10c can operate in the non-key-retaining mode. Naturally, repeated inter-function conversion can be effectuated by reversing and/or repeating the processes described above.

Figure 6C:
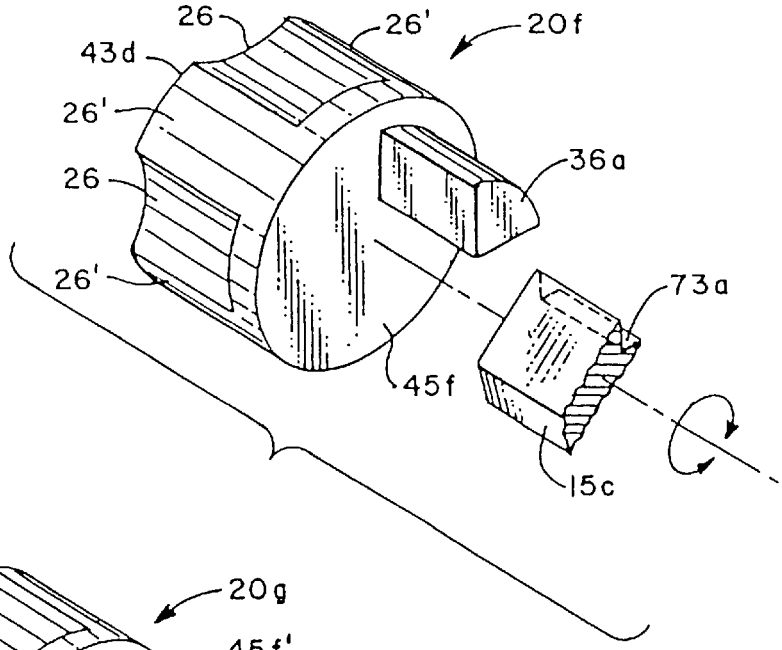

One variation of the embodiment of FIGS. 6a and 6b is illustrated in FIG. 6c. As shown in FIG. 6c, protrusion 36a' (FIG. 6b) could optionally take another of a great many cross-sectional shapes such as the circular-sector shape of protrusion 36a. Additionally, the embodiment of FIG. 6c includes a companion actuator 15c having an elongated V-shaped recess 73a for complementary engagement with protrusion 36a. As with the embodiment of FIGS. 6a and 6b, the embodiment of FIG. 6c provides for both key-retaining and non-key-retaining modes of operation by selective orientation and placement of actuator 15c relative to rotator bolt 20f upon insertion of cylinder 13 into padlock body 12.

Rotator bolt 20f of FIG. 6c also includes an additional feature at second end 43d. As shown, second end 43d preferably includes release-mechanism-engaging portions 26 disposed at four equidistant locations about the rotation axis of rotator bolt 20f. Four full diameter portions 26' are disposed between portions 26 and protrusion 36a is disposed in alignment with one of full diameter portions 26'. This arrangement permits rotator bolt 26f to accommodate both horizontal and vertical actuators in both key-retaining and non-key-retaining modes of operation by appropriately orienting rotator bolt 26f within padlock body 12. This arrangement, however, assumes that rotator bolt 20f will be used in a padlock having a pair of locking balls rather than one as shown, for example, in FIG. 6a. Thus, if only one locking ball is utilized, two radial cuts 26, preferably located approximately 90° apart, can be used to accommodate both horizontal and vertical tailpieces. Furthermore, those of ordinary skill will appreciate that protrusion 36a could easily be relocated as appropriate for any tailpiece orientation without departing from the spirit and scope of the invention. Naturally, the above-noted features could be incorporated into any of the unitary rotator bolts shown and described herein.

Figure 6D:
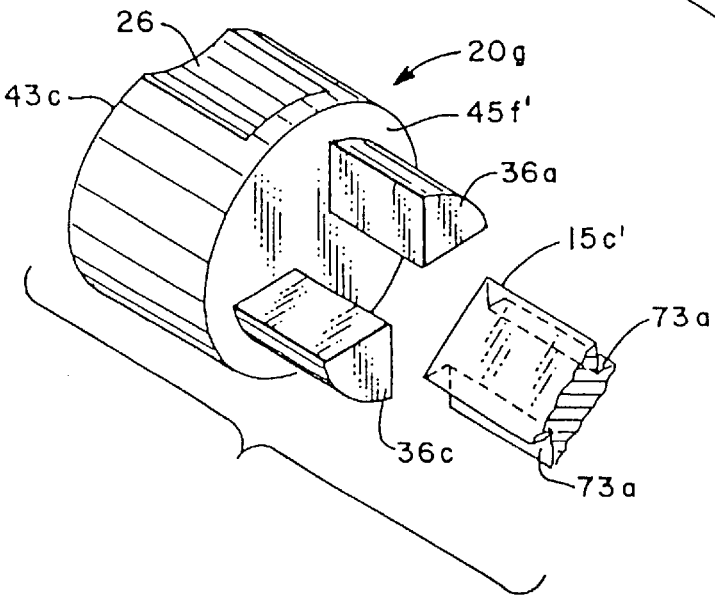

Yet another variation of the embodiment of FIGS. 6a and 6b is illustrated in FIG. 6d. It will be appreciated that the second end of rotator bolt 20g (FIG. 6d) is identical to that of rotator bolt 20e of FIG. 6b. It will also be appreciated that actuator-engaging portion 45f' and actuator 15c' (FIG. 6d) are substantially similar to those of FIG. 6c. The primary difference between actuator-engaging portions 45f and 45f' resides in the presence of an arcuately spaced second protrusion 36c in the embodiment of FIG. 6d. Also, actuator 15c' is provided with a pair of elongated recesses in order to accommodate the presence of both oppositely disposed protrusions 36a and 36c. This arrangement operates in the same general manner as rotator bolt 20f of FIG. 6c but offers the advantage of better engagement between rotator bolt 20g and actuator 15c'.

Figure 7A:
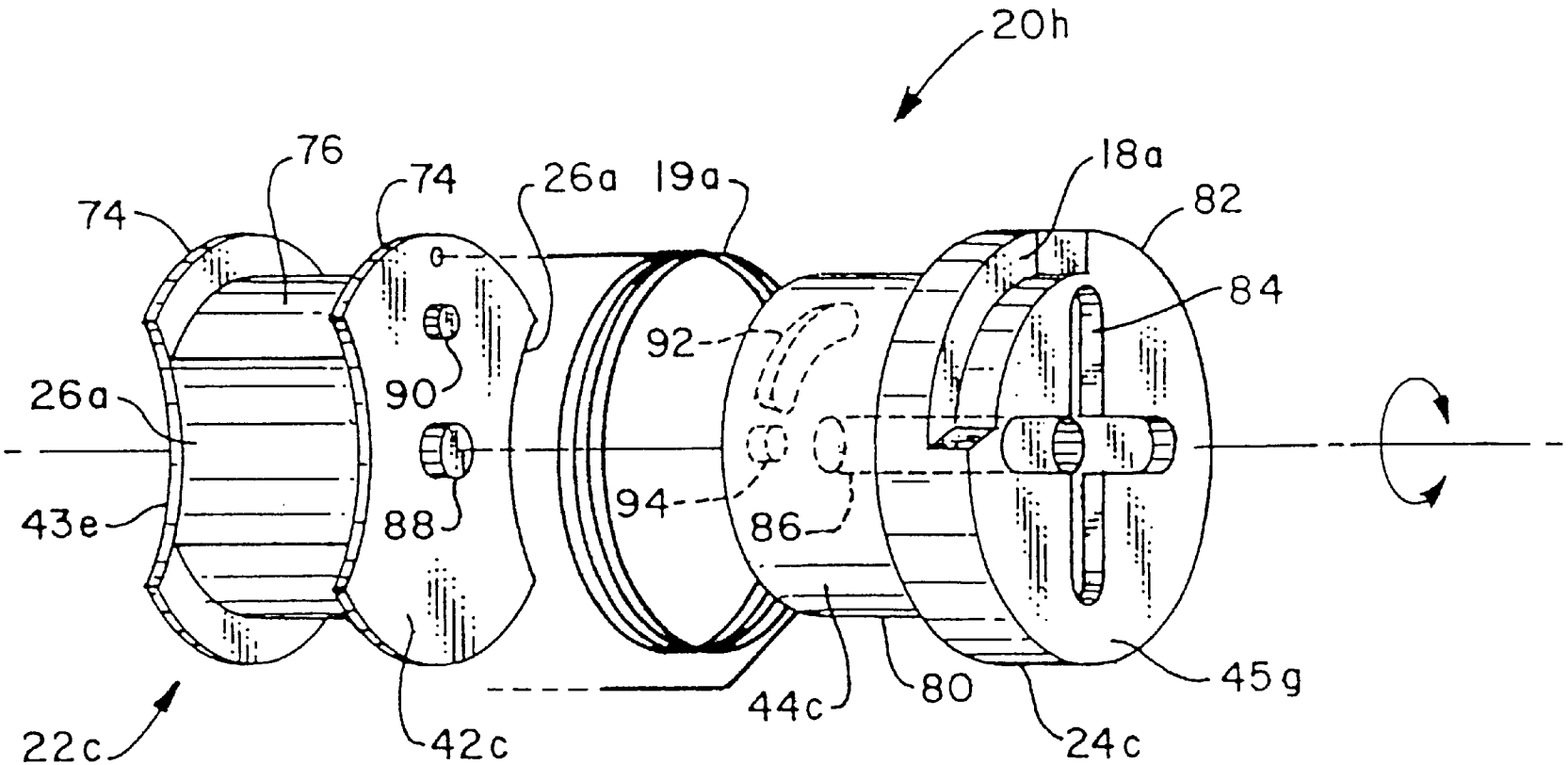
FIG. 7a is a exploded perspective view of still another preferred embodiment of the dual-function lock sub-assembly of the present invention.

Turning now to FIG. 7a, there is shown another dual-function subassembly 20h in accordance with the invention. As shown in FIG. 7a, sub-assembly 20h preferably comprises first and second rotator members 24c and 22c, respectively, and an optional torsion spring 19a. Those of ordinary skill will readily appreciate that this dual-function lock subassembly 20h can be utilized with any of the actuators shown and/or described herein and, additionally, can be utilized in locks of the general nature of padlock 10 (FIG. 1a).

Second rotator member 22c preferably includes a release-mechanism-engaging portion 26a comprising radial cuts through an inner section 76 and larger end walls 74. Second member 22c also includes a confronting end face 42c and an oppositely disposed second end 43e. An optional axial stud 88 can also be provided along the rotation axis of second member 22c. Similarly, a recess-engaging protrusion 90 is provided at a radial distance from the rotation axis. Protrusion 90 is designed for engagement with complementary recesses 92 and 94 disposed on confronting end face 44c of first rotator member 24c. An aperture 78, or any other suitable affixation means, can be provided on wall 74 of second member 22c in order to fixedly receive one end of spring 19a. The other end of spring 19a will be affixed to the lock within which sub-assembly 20h is used and provides for automatic locking of the lock. As shown in FIG. 7a, spring 19a is preferably coiled around first rotator member 24c at a second end thereof.

First rotator member 24c includes an enlarged diameter portion 82 at the actuator-engaging portion 45g and a reduced diameter portion 80 near confronting end face 44c. Reduced diameter portion 80 permits first member 24c to receive spring 19a without increasing the overall diameter of sub-assembly 20h and without interfering with actuator-engaging portion 45g. Confronting end face 44c includes an elongated lost-motion recess 92 and an arcuately spaced anchor recess 94 which are designed for selective engagement with recess-engaging member 90. As an optional feature of sub-assembly 20h, arcuate recess 92 traverses less than 90°, but still permits sufficient rotation of second rotator member 22c during use to lock and unlock a lock. However, other suitable arrangements of recesses 92 and 94 (such as permitting recess 92 to traverse 90° and to locate anchor recess 94 approximately 90° from one end of recess 92) are also within the scope of the invention. An optional bore 86 extends through first member 24c along the rotation axis and cooperates with member 88 to assist in appropriate alignment for rotation. A rotator stop groove can be provided on first rotator member 24c to prevent over-rotation of engaging actuator. Sub-assembly 20h is preferably maintained within a padlock with an axially oriented screw having a head which rides within rotator stop groove 18a. Thus, rotation of first member 24c is limited by engagement of the screw head with end walls of groove 18a.

This arrangement eliminates the need for a separate rotator stop component such as rotator stop 18 of FIG. 1a, for example.

Actuator-engaging portion 45g of sub-assembly 20h preferably includes a cross-shaped recess 84 for engaging the actuator of a lock cylinder. As shown, recess 84 is designed to accommodate both horizontal and vertical tailpieces. However, recess 84 can be rotated to accommodate tailpieces of any angular orientation between horizontal and vertical orientations. Similarly, many other recess and/or protrusions can be utilized on actuator-engaging portion 45g as appropriate to accommodate the many styles of actuators available in the lock industry.

Figure 7B:
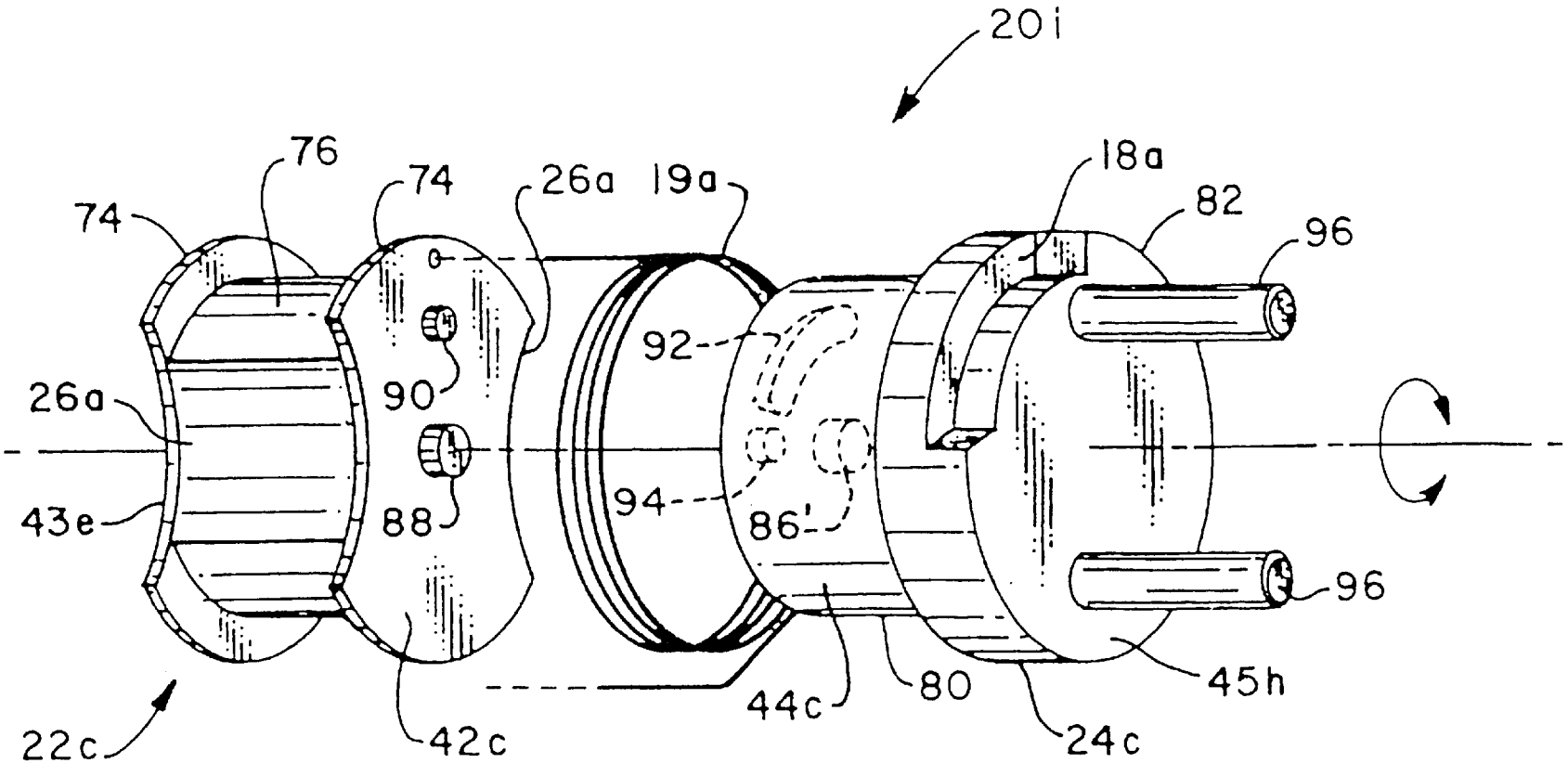
FIG. 7b is an exploded perspective view of yet another preferred embodiment of the dual-function lock sub-assembly of the present invention.

Still another dual-function lock sub-assembly in accordance with the present invention is shown in FIG. 7b. As indicated by the use of like reference numerals, much of sub-assembly 20i of FIG. 7b is substantially identical to sub-assembly 20h of FIG. 7a except that actuator-engaging recess 84 has been replaced with protrusions 96 for reception within an interchangeable core type lock cylinder. Naturally, other styles of protrusions and/or lugs can be utilized as desired to ensure cooperation with an appropriate tailpiece and/or lock cylinder. A final distinction between sub-assemblies 20h and 20i resides in the utilization of a shallow recess 86' in sub-assembly 20i (rather than the elongated aperture 86 of sub-assembly 20h).

Naturally, sub-assemblies 20h and 20i will operate equally effectively if the location of recess-engaging member 90 and recesses 90 and 94 are reversed or otherwise reoriented. These sub-assemblies are capable of providing both key-retaining and non-key-retaining lock functions in the same general manner as the embodiment of FIGS. 2a–2d. However, as noted above, sub-assemblies 20h and 20i are typically maintained within a padlock by the cooperation of a retaining screw and rotator stop groove 18a. Thus, reorientation of first and second rotator members 24c and 22c is accomplished by loosening the retaining screw, reorienting these members relative to one another and re-tightening the retaining screw.

While the present invention has been described in connection with what is presently considered to be the most practical and preferred embodiments, it is to be understood that the invention is not limited to the disclosed embodiments, but is intended to cover the various modifications and equivalent arrangements included within the spirit and scope of the appended claims.

What is claimed is:

1. A dual-function lock sub-assembly for use with locks of the type having a lock cylinder and a release mechanism, said sub-assembly comprising:

an axis-defining first rotator component having an actuator-engaging portion at a first end thereof, said first component also having an opposite second end and being rotatable about an axis;

a second rotator component having a release-mechanism-engaging portion at a first end thereof for controlling movement of the release-mechanism, said second component having an opposite second end and being adjacent to and axially aligned with said first component for rotation about said rotation axis;

wherein said second ends of said components confront one another, wherein said second confronting end of one of said first and second components has lost-motion and anchoring recesses which are radially offset from said rotation axis, and wherein said second confronting end of the other of said first and second components has a recess-engaging member which is configured such that said recess-engaging member can be received within one of said lost-motion and anchoring recesses; and an actuator for connecting said actuator-engaging portion of said first rotator component to the lock cylinder, said actuator transferring rotational motion about said axis from the lock cylinder to said first component upon rotation of the lock cylinder so that when said recess-engaging member is received in said lost-motion recess, rotational motion of said actuator results in limited lost-motion between [said actuator and] said first component *and said second component* and when said recess-engaging member is received in said anchoring recess, said [actuator] *first component* is [rotatable] *positively* coupled to said [first] *second* component.

2. The dual-function lock sub-assembly of claim 1 wherein said actuator comprises a pair of elongated protrusions extending from said first end of said first rotator component in a direction which is substantially parallel to said axis, said protrusions being disposed on opposite sides of said axis.

3. the dual-function lock sub-assembly of claim 1 wherein said actuator comprises a generally blade-shaped tailpiece which can be received within said actuator-engaging portion of said first rotator component.

4. The dual-function lock sub-assembly of claim 1 further comprising a torsion spring, said torsion spring resiliently biasing said second rotator component and being coiled about at least a portion of said first rotator component.

5. A dual-function padlock capable of repeated conversion between key-retaining and non-key-retaining lock functions, said padlock comprising:

a padlock body;

a shackle which is at least partially disposed within the padlock body;

at least one movable shackle-release-mechanism to selectively release/retain said shackle;

a rotatable lock cylinder at least partially mounted within the padlock body and defining a rotation axis;

an actuator which rotates about said rotation axis in response to rotation of at least part of said cylinder; and a function-determinative rotator bolt mounted within the padlock body for rotation about said axis, said rotator bolt including a first end having a release-mechanism-engaging portion for controlling movement of said shackle-release-mechanism, said rotator bolt also including an oppositely-disposed second end for receiving said actuator, said rotator bolt cooperating with said actuator such that said padlock can be converted between key-retaining and non-key-retaining functions without introduction of any additional components therebetween, and without removal of any components from between said rotator bolt and said actuator.

6. The dual-function padlock of claim 5 wherein said rotator bolt comprises:

first and second axially-aligned rotator members having confronting first end faces and oppositely facing second end faces;

means defining a lost-motion recess and an anchor recess in one of said confronting first end faces, said recesses being radially spaced from said axis;

at least one recess-engaging member extending from the other of said confronting end faces, said at least one recess-engaging member cooperating with said means defining said recesses such that said recess-engaging member can be selectively disposed within either one of said recesses, at least in part, by rotating said rotator members relative to one another; and means for maintaining said actuator stationary relative to at least one of said first and second rotator members, said means for maintaining being disposed at said second end of said rotator bolt.

7. The dual-function padlock of claim 5 wherein said rotator bolt comprises:

a unitary rotator bolt having an actuator-engaging portion disposed at said second end of said rotator bolt, said actuator-engaging portion having a first section which permits lost-motion between said actuator and said rotator bolt;

said actuator-engaging portion also having an arcuately spaced second section for preventing lost-motion between said actuator and said rotator bolt; and whereby the lock function is selectively determined by placing said actuator into one of said first and second sections of said actuator-engaging portion.

8. The dual-function padlock of claim 5 wherein said rotator bolt comprises:

a first rotator member having an actuator-engaging portion at one end thereof, said first rotator member also having an opposite second end and being rotatable about said rotation axis;

a second rotator member having a release-mechanism-engaging portion at one end thereof, having an opposite second end and being rotatable about said rotation axis, one of said first and second rotator members having lost-motion and anchoring recesses which are radially offset from said axis and which are disposed on the second end of said member, the other of said first and second rotator members having a protrusion extending from said second end thereof such that said protrusion can be received within either one of said recesses when said rotator members are axially aligned and when said second ends of said rotator members are placed adjacent one another.

9. A rotator bolt sub-assembly for use in a lock of the type having a release-mechanism and an actuator, said sub-assembly comprising:

first and second axially-aligned rotator members having confronting first end faces and oppositely facing second end faces, said rotator members defining a rotation axis and being rotatable about said axis;

means defining a lost-motion recess and an anchor recess in one of said confronting first end faces, said recesses being radially spaced from said axis;

at least one recess-engaging member extending from the other of said confronting end faces, said at least one recess-engaging member cooperating with said means defining said recesses such that said recess-engaging member can be selectively disposed within either one of said recesses, at least in part, by rotating said rotator members relative to one another;

means for transferring rotational motion about said axis from the actuator to said rotator members, said means for transferring being disposed on said second end face of one of said rotator members; and means for actuating the lock release-mechanism in response to transfer of rotational motion to said rotator members, said means for actuating being disposed on said second end face of the other of said rotator means.

10. The rotator bolt sub-assembly of claim 9 wherein said lost-motion recess is an elongated arcuate recess, wherein said recess-engaging member has a profile, wherein said anchor recess is arcuately adjacent said elongated recess and wherein said anchor recess has a shape which is substantially complementary to said profile of said recess-engaging member.

11. The rotator bolt sub-assembly of claim 10 wherein said recess-engaging member is a fixed protrusion and wherein said first and second rotator members must be axially displaced from one another to change the recess in which said protrusion is located.

12. The rotator bolt sub-assembly of claim 10 wherein said recess-engaging member is a linearly-movable, spring-loaded pin.

13. The rotator bolt sub-assembly of claim 9 wherein:

said lost-motion recess is an arcuate recess of a first predetermined axial depth, said anchor recess is disposed at one end of said elongated recess; and said anchor recess extends axially deeper than said lost-motion recess.

14. The rotator bolt sub-assembly of claim 13 wherein said recess-engaging member comprises an externally-threaded screw disposed within an internally-threaded bore and wherein said anchor recess is an internally-threaded bore.

15. The rotator bolt sub-assembly of claim 9 further comprising means for resiliently biasing said first and second rotator members axially adjacent one another.

16. The rotator bolt sub-assembly of claim 9 further comprising means for preventing over-rotation of the rotator bolt, said means for preventing being at least partially disposed on one of said first and second rotator members.

17. The rotator bolt sub-assembly of claim 16 wherein said means for preventing over-rotation comprises an arcuate recess.

18. The rotator bolt sub-assembly of claim 9 wherein said means for engaging the release mechanism comprises four radial cuts equidistantly disposed about one of said first and second rotator members.

19. The rotator bolt sub-assembly of claim 9 further comprising a torsion spring, wherein one of said first and second rotator members includes means for affixing said torsion spring thereto, and wherein the torsion spring can be coiled either about or within the other of said first and second rotator members.

20. The rotator bolt sub-assembly of claim 9 wherein at least a portion of said elongated and anchor recesses extends from said confronting end faces of one of said rotator members entirely through said second end face of said rotator member.

21. The rotator bolt sub-assembly of claim 9 wherein said means for transferring prevents lost-motion between the actuator and said at least one of said rotator members.

22. The rotator bolt sub-assembly of claim 9 wherein said means for transferring is disposed on said second end of one of said rotator members and wherein said second end of the other of said rotator members includes means defining a recess for receiving the torsion spring.

23. The rotator bolt sub-assembly of claim 12 wherein said lost-motion recess and said anchor recess extend entirely through one of said first and second members.

24. A dual-function lock sub-assembly for a lock of the type having a release-mechanism and an axis-defining lock-cylinder which is capable of transferring rotational motion to an actuator, said sub-assembly comprising:

an actuator mounted to the lock-cylinder for axial rotation therewith, said actuator having a free end; and a unitary rotator bolt having a release-mechanism-engaging portion at one end thereof for controlling movement of the release-mechanism and an integral dual-function actuator-engaging portion at an opposite end thereof, said actuator-engaging portion having a first section which permits limited lost-motion between said free end of said actuator and said rotator bolt, said actuator-engaging portion also having an arcuately spaced second section for preventing lost-motion between said free end of said actuator and said rotator bolt, wherein a lock function is selectively determined by placing said free end of said actuator into said first section of said actuator-engaging portion and wherein another lock function is selectively determined by placing said free end of said actuator into said second section of said actuator-engaging portion.

25. The lock sub-assembly of claim 24 wherein:

said first and second portions of said actuator-engaging portion comprise three protrusions extending from said opposite end of said rotator bolt in a direction which is at least substantially parallel to the axis, said protrusions being disposed around the axis at three of four locations arcuately spaced 90° apart; and at least a portion of said free end of said actuator is disposed on only one side of, and is oriented at least substantially parallel to, the axis.

26. The lock sub-assembly of claim 24 wherein:

said first section of said actuator-engaging portion comprises an arcuate recess;

said second section of said actuator-engaging portion comprises an anchor recess arcuately spaced from said arcuate recess; and at least a portion of said actuator is disposed on only one side of, and is oriented at least substantially parallel to, the axis.

27. The sub-assembly of claim 24 wherein:

said first and second sections of said actuator-engaging portion comprises at least one elongated member extending from said opposite end of said rotator bolt, each member having a cross-sectional shape; and said actuator includes at least one axially-extending recess which is capable of rigid engagement with one of said members, each recess being defined by at least one bearing wall and being complementary in shape to one of said members.

28. The lock sub-assembly of claim 27 wherein:

said first and second sections of said actuator-engaging portion comprise an unoccupied volume and at least one post, said post being circular in cross-section; and said actuator includes at least one recess for engagement with said post, said at least one recess being at least partially circular in cross 1 sectional shape.

29. The lock sub-assembly of claim 24 wherein said release-mechanism-engaging portion includes four radial recesses disposed at four locations angularly spaced 90° from one another about said rotator bolt.

* * * * *